United States Patent
Cromwell et al.

(10) Patent No.: US 8,223,206 B2
(45) Date of Patent: Jul. 17, 2012

(54) INFRARED CAMERA FILTER WHEEL SYSTEMS AND METHODS

(75) Inventors: Brian Cromwell, Niceville, FL (US); Calvin Banks, Niceville, FL (US)

(73) Assignee: FLIR Systems, inc., Wilsonville, OR (US)

( * ) Notice: Subject to any disclaimer, the term of this patent is extended or adjusted under 35 U.S.C. 154(b) by 945 days.

(21) Appl. No.: 12/252,063

(22) Filed: Oct. 15, 2008

(65) Prior Publication Data
US 2010/0091089 A1    Apr. 15, 2010

(51) Int. Cl.
H04N 5/33    (2006.01)
H04N 9/64    (2006.01)
H01L 31/00    (2006.01)

(52) U.S. Cl. ............ 348/164; 250/330; 348/33

(58) Field of Classification Search .......... 348/32–33, 348/162–168; 250/316.1–319, 330–334
See application file for complete search history.

(56) References Cited

U.S. PATENT DOCUMENTS

| | | | |
|---|---|---|---|
| 5,300,780 A | | 4/1994 | Denney |
| 6,515,285 B1 * | | 2/2003 | Marshall et al. ............ 250/352 |
| 7,166,832 B2 * | | 1/2007 | Takenaka ................... 250/221 |
| 2006/0252017 A1 * | | 11/2006 | Vorozhtsov et al. ........ 434/247 |
| 2007/0002143 A1 * | | 1/2007 | Elberbaum ................. 348/188 |
| 2009/0159799 A1 * | | 6/2009 | Copeland et al. .......... 250/338.1 |
| 2010/0127173 A1 * | | 5/2010 | Schmidt ..................... 250/338.5 |

FOREIGN PATENT DOCUMENTS

| | | | |
|---|---|---|---|
| JP | 2003 309856 | * | 10/2003 |
| WO | WO 98/22806 | | 5/1998 |
| WO | WO 2007058102 A1 | * | 5/2007 |

OTHER PUBLICATIONS

Santa Barbara Focalplane, ImageIR—The World's Most Configurable Infrared Lab Camera System, http://www.sbfp.com/imagir_camera.html, 2007, 2 pages.
FLIR®, SC7900-VL, Technical specifications,1 page.
FLIR®, ORION SC7000 Series, MW & LWIR Multispectral Imaging system for R&D and signature analysis, 2 pages.
FLIR®, SC7000 Series, Complete Range of State-of-the-art technology systems for R&D and Thermography, 2 pages.

* cited by examiner

*Primary Examiner* — Brendan Higa
(74) *Attorney, Agent, or Firm* — Haynes and Boone, LLP

(57) ABSTRACT

Various techniques are provided for identifying filters used with infrared cameras. A plurality of filters may be installed in a filter wheel of an infrared camera. Identifiers associated with the filters may be read by the infrared camera to identify the various types of filters currently installed in the filter wheel. The installed filters can be selected by the camera or a user for use in particular applications as desired. For example, filters may be selected based on associations between the filters, filter identifiers, and targets stored in a table or other record maintained by the infrared camera. Settings of the infrared camera may be adjusted in response to filter selections.

26 Claims, 9 Drawing Sheets

INFRARED CAMERA FILTER WHEEL SYSTEMS AND METHODS

BACKGROUND

1. Field of the Invention

The present invention relates generally to infrared cameras and, more particularly, to techniques for filtering infrared wavelengths provided to infrared cameras.

2. Related Art

As is well known, infrared cameras can be used to capture infrared images of desired targets. In this regard, different targets may radiate and/or absorb various infrared wavelengths depending, for example, on their material composition and properties. Thus, in order to capture images of particular targets, it is often necessary to filter the infrared wavelengths received by an infrared camera's sensor circuitry.

Unfortunately, conventional filtering techniques typically require a user to select filters that are suitable for particular applications. After a user has identified an appropriate filter, the user manually attaches the filter to an infrared camera which then captures an infrared image of a target. If a user wishes to view another target, a different filter may be needed. In this case, the user must remove the previously-installed filter, identify a new appropriate filter, and attach the new filter to the infrared camera before capturing another infrared image.

The above approach can be cumbersome for users, especially if images of different types of targets must be repeatedly captured. Moreover, users with limited knowledge of the infrared wavelengths or filters associated with particular targets may be unable to successfully select the filters necessary to capture desired images. Accordingly, there is a need for an improved approach to the selection of filters used with infrared cameras that overcomes some or all of the deficiencies discussed above.

SUMMARY

Various techniques are provided for identifying filters used with infrared cameras. For example, a plurality of filters may be installed in a filter wheel of an infrared camera. Identifiers associated with the filters may be read by the infrared camera to identify the various types of filters currently installed in the filter wheel. The installed filters can be selected by the camera or a user for use in particular applications as desired. Filters may be selected based on associations between the filters, filter identifiers, and targets stored in a table or other record maintained by the infrared camera. In addition, settings of the infrared camera may be adjusted in response to filter selections.

In one embodiment, an infrared camera includes an infrared sensor; a filter wheel comprising: a plurality of filters adapted to selectively filter infrared radiation prior to the infrared radiation being received by the infrared sensor, and a plurality of filter identifiers associated with the filters, wherein each filter identifier identifies a corresponding one of the filters; a plurality of sensors adapted to read the filter identifiers to identify the filters installed in the filter wheel; a memory; and a processor adapted to store in the memory a record of the filters installed in the filter wheel based on the filter identifiers read by the sensors.

In another embodiment, a filter wheel includes a plurality of filters adapted to selectively filter infrared radiation corresponding to a plurality of targets; and a plurality of filter identifiers associated with the filters, wherein each filter identifier identifies a corresponding one of the filters, wherein the filter identifiers are adapted to be read by sensors of an infrared camera.

In another embodiment, a method of identifying filters of an infrared camera includes scanning a plurality of filter identifiers associated with the filters installed in a filter wheel of the infrared camera, wherein the filters are adapted to selectively filter infrared radiation prior to the infrared radiation being received by an infrared sensor of the infrared camera; determining whether a selected filter is installed in the filter wheel based on the scanning; and rotating the filter wheel to position the selected filter in front of an infrared sensor of the infrared camera if the selected filter is installed in the filter wheel.

In another embodiment, an infrared camera includes a plurality of filters adapted to selectively filter infrared radiation prior to the infrared radiation being received by an infrared sensor for the infrared camera; means for securing the filters; means for identifying each of the filters; means for reading the identifying means to identify the filters installed in the securing means; and means for storing a record of the filters installed in the securing means based on the identifying means read by the reading means.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE FIGURES

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
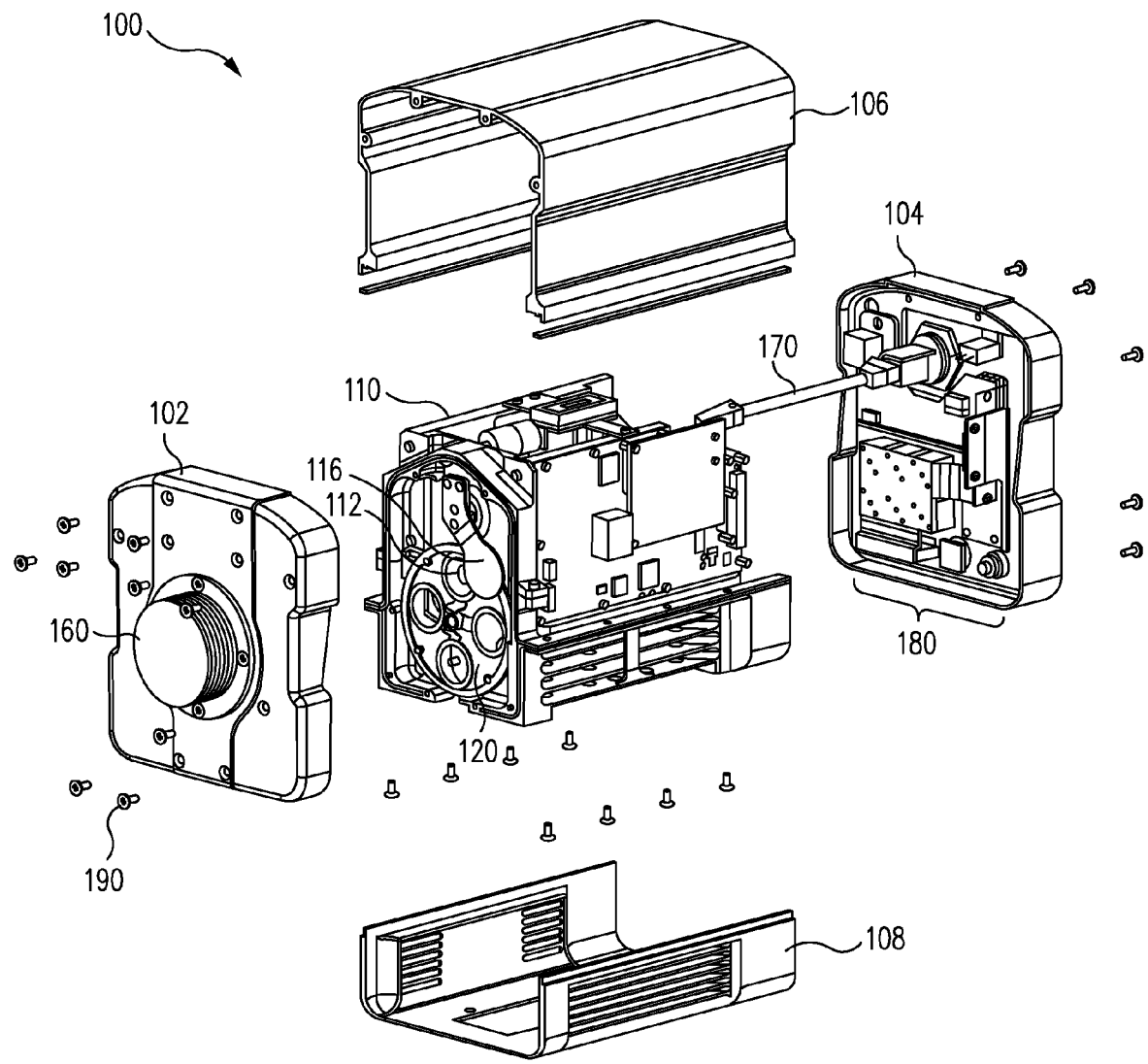
FIG. 1 illustrates an exploded view of an infrared camera in accordance with an embodiment of the invention.

FIG. 1 illustrates an exploded view of an infrared camera 100 in accordance with an embodiment of the invention. Infrared camera 100 includes a main body 110 to which various covers may be attached such as a front cover 102, a back cover 104, a top cover 106, and a bottom cover 108 using screws 190 or other appropriate fasteners. Infrared camera 100 also includes a lens 160 shown in FIG. 1 attached to front cover 102.

Main body 110 includes a shutter 116 which may be selectively positioned in front of an aperture 112 by an appropriate servo motor. Shutter 116 may also operate as a calibration flag to facilitate calibration of sensor circuitry of infrared camera 100. Main body 110 may further include an infrared sensor and associated circuitry further described herein.

A filter wheel 120 is attached to main body 110. Filter wheel 120 may be rotated to selectively position various filters in front of aperture 112 to filter infrared wavelengths received through lens 160.

Back cover 104 includes a communication link 170 (e.g., a gigabit ethernet link, a gigabit serial image data output, a GigE Vision® interface, or other communication link) which may interface with appropriate circuitry of main body 110 for data communication (for example, passing infrared image data). Additional circuitry 180 is attached to back cover 104 which may be used to provide, for example, various connections and/or a display which may be viewed by a user from the opposite side of back cover 104 as further described herein.

FIGS. 2-8 illustrate further aspects of filter wheel 120 and related components. Filter wheel 120 may be used to hold or otherwise secure a plurality of filters 140. As shown, filter wheel 120 includes a ring 128 and a plate 126 configured to receive a plurality of filter holders 130. Filter wheel 120 also includes a shaft 129 which may be mechanically engaged with a filter wheel gear 122. Filter wheel 120 further includes a plurality of position identifiers 134 which may be read by appropriate sensors of infrared camera 100 to align filter wheel 120.

Figure 5:
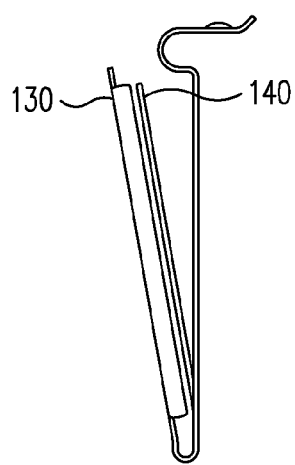
FIG. 5 illustrates a filter holder in accordance with an embodiment of the invention.

Filter holders 130 may be opened as shown in FIG. 5 to receive optical filters 140 which are secured in filter wheel 120 by filter holders 130. In this regard, users of infrared camera 100 may selectively install and remove various filters 140 from filter holders 130 as may be desired for particular applications. Although four filter holders 130 and four filters 140 are shown in embodiments illustrated in FIGS. 2-4, any desired number filter holders 130 and filters 140 may be used in other embodiments, as discussed further herein.

Figure 6:
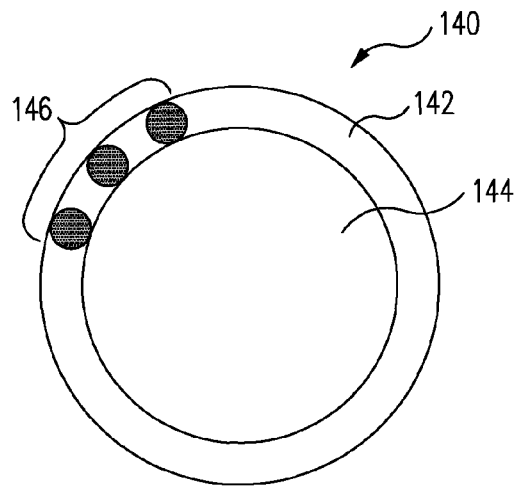
FIG. 6 illustrates a filter in accordance with an embodiment of the invention.

FIG. 6 illustrates an example of one of filters 140. As shown in FIG. 6, filter 140 includes filtering material 144 surrounded by an outer ring 142. When installed in filter wheel 120, outer ring 142 is clamped by one of filter holders 130 which leaves substantially all of filtering material 144 (e.g., conventional filtering materials) exposed. Filter 140 may also include markings 146 such as colored dots or other markings to distinguish filter 140 when it is not installed in one of filter holders 130.

In one embodiment, filter 130 may have a thickness of approximately 1 mm, outer ring 142 may have an outside diameter of approximately 25.4 mm+/−0.2 mm, and filtering material 144 may have a diameter of approximately 24 mm or greater. Filters 140 having other dimensions may be used in other embodiments.

Different filters 140 may be used to filter various ranges of infrared wavelengths. For example, the following Table 1 identifies filtering characteristics of several different filters 140 available from Spectrogon US, Inc. of Parsippany, N.J. which may be used in various embodiments:

TABLE 1

| Filter Identifier 150 | Filter Name/Target | Type | BP Center (nm) | BP Width (nm) | BP Low (nm) | BP High (nm) | Blocking (nm) | Spectrogon Part No. |
|---|---|---|---|---|---|---|---|---|
| 1 | ND 1.0 | ND | — | — | 2000 | 5000 | — | ND-IR-OD-1.0-025.4 × 1.0 mm |
| 2 | ND 2.0 | ND | — | — | 2000 | 5000 | — | ND-IR-OD-2.0-025.4 × 1.0 mm |
| 3 | ND 3.0 | ND | — | — | 2000 | 5000 | — | ND-IR-OD-3.0-025.4 × 1.0 mm |
| 4 | ND 0.3 | ND | — | — | 2000 | 5000 | — | ND-IR-OD-0.3-025.4 × 1.0 mm |
| 5 | ND 0.6 | ND | — | — | 2000 | 5000 | — | ND-IR-OD-0.6-025.4 × 1.0 mm |
| 6 | ND 1.45 | ND | — | — | 2000 | 5000 | — | ND-IR-OD-1.45-025.4 × 1.0 mm |
| 7 | Standard MWIR | BBP | — | — | 3000 | 5000 | — | BBP-3000-5000c |
| 8 | ATM | BBP | — | — | 3400 | 4170 | — | BBP-3400-4170c |
| 9 | Solar Block (SRX) | LP | — | — | 3500 | 5000 | 100 | LP-3500 |
| 10 | Thru Glass (TGL) | BP | 2345 | 100 | 2295 | 2395 | 3500 | BP-2345-100 |
| 11 | Glass High Temp (GHT) | BP | 5000 | 145 | 4928 | 5073 | — | BP-5000-145 |
| 12 | Narrow Band Flame or HT | BP | 3900 | 150 | 3825 | 3975 | — | BP-3900-150 |
| 13 | Broad Band Flame | BBP | — | — | 3700 | 4200 | — | BBP-3750-4020c |
| 14 | Polyethylene (PEN) | BP | 3450 | 100 | 3400 | 3500 | — | BP-3450-100 |
| 15 | Plastic | BP | 3410 | 130 | 3345 | 3475 | — | BP-3410-130 |
| 16 | CO2 | BP | 4350 | 180 | 4260 | 4440 | — | BP-4275-200 |
| 17 | Nitrous-Oxide | BP | 4500 | 160 | 4420 | 4580 | — | BP-4500-160 |
| 18 | COS | NP | 4220 | 85 | 4178 | 4263 | — | NB-4220-085 |

As shown in Table 1, various types of filters 140 may be used such as neutral density (ND) filters, broad-bandpass (BBP) filters, longwave-pass (LP) filters, bandpass (BP) filters, and shortwave-pass (SP) filters. Filters 140 may filter infrared wavelength ranges suitable for infrared images of different targets. For example, the "CO2" filter 140 passes infrared wavelengths suitable for capturing infrared images of carbon dioxide gas.

Each filter 140 is associated with a corresponding filter identifier 150 which may be read by infrared camera 100 to identify each filter 140. In one embodiment, filter identifiers 150 may be implemented as labels attached to filter holders 130 associated with various filters. In another embodiment, filter identifiers 150 may be etched, painted, or otherwise marked on filter holders 130. In other embodiments, filter identifiers 150 may be provided on filters 140, other portions of filter wheel 120, and/or other portions of infrared camera 100 where appropriate.

Figure 7:
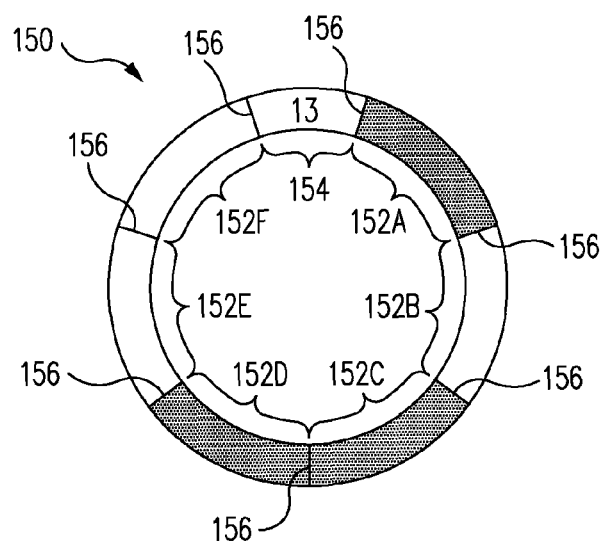
FIG. 7 illustrates a filter identifier in accordance with an embodiment of the invention.

FIG. 7 illustrates an embodiment of one of filter identifiers 150 implemented as a label encoded with a six bit binary number. As shown in FIG. 7, filter identifier 150 includes six regions 152A-F, each of which corresponds to one bit of a six bit binary number, with region 152A corresponding to the least significant bit position. In this embodiment, regions 152A-F are separated by lines 156. In another embodiment, lines 156 may be omitted.

Figure 8:
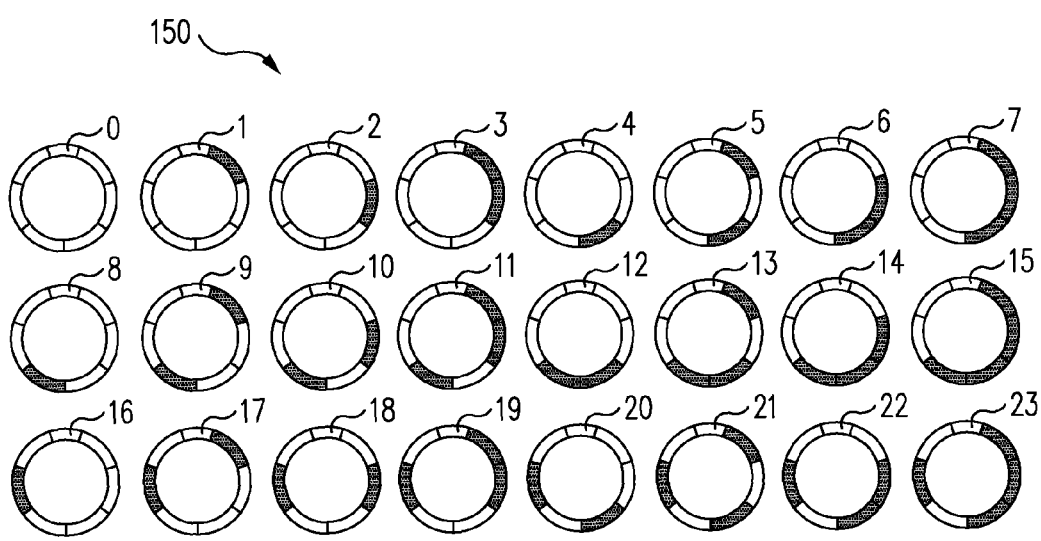
FIG. 8 illustrates a plurality of filter identifiers in accordance with an embodiment of the invention.

In FIG. 7, dark (e.g., non-reflective) surfaces in regions 152A, 152C, and 152D correspond to binary values of 1, and light (e.g., reflective or mirrored) surfaces in regions 152B, 152E, and 152F correspond to binary values of 0. Accordingly, in this embodiment, filter identifier 150 of FIG. 7 corresponds to the binary value: 001101. As identified in region 154, this filter identifier 150 also corresponds to the decimal value: 13. Thus, it will be appreciated that filter identifier 150 of FIG. 7 identifies the "Broad Band Flame" filter 140 of Table 1. FIG. 8 illustrates additional examples of filter identifiers 150 having binary values ranging from 00000 to 010111 (0 to 23 in decimal values).

It will be appreciated that by encoding filter identifiers 150 using six bit binary numbers, up to 64 unique filter identifiers 150 may be provided. However, any desired number of binary numbers or other encoding methods may be used in other embodiments.

Figure 3:
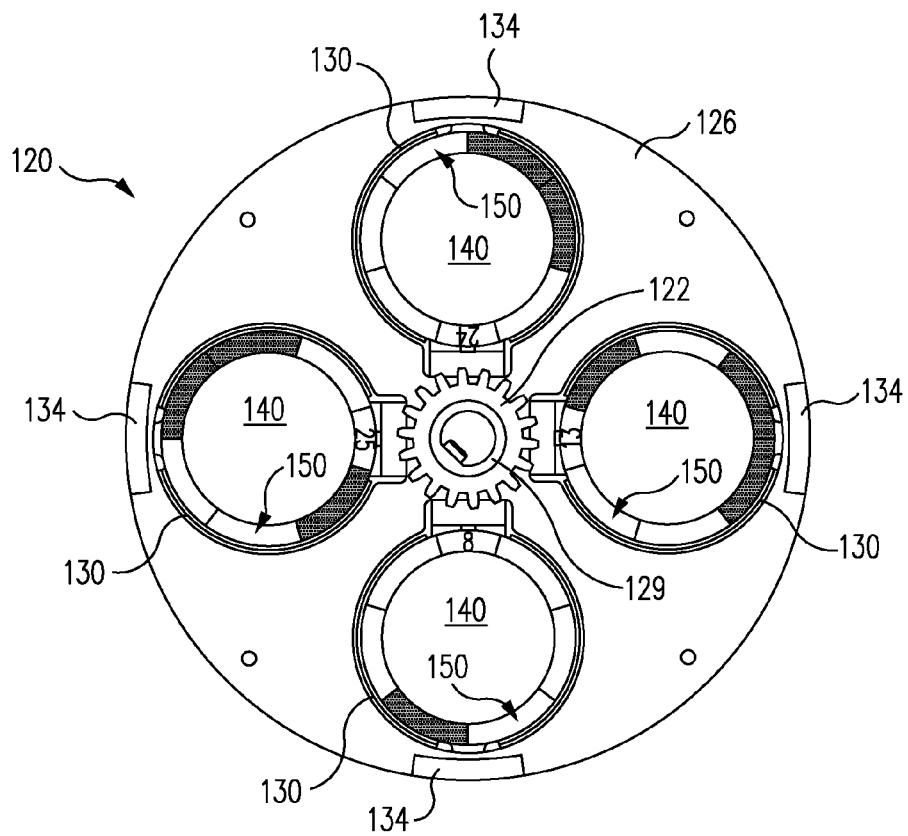
FIG. 3 illustrates a back side view of a filter wheel in accordance with an embodiment of the invention.
Figure 4:
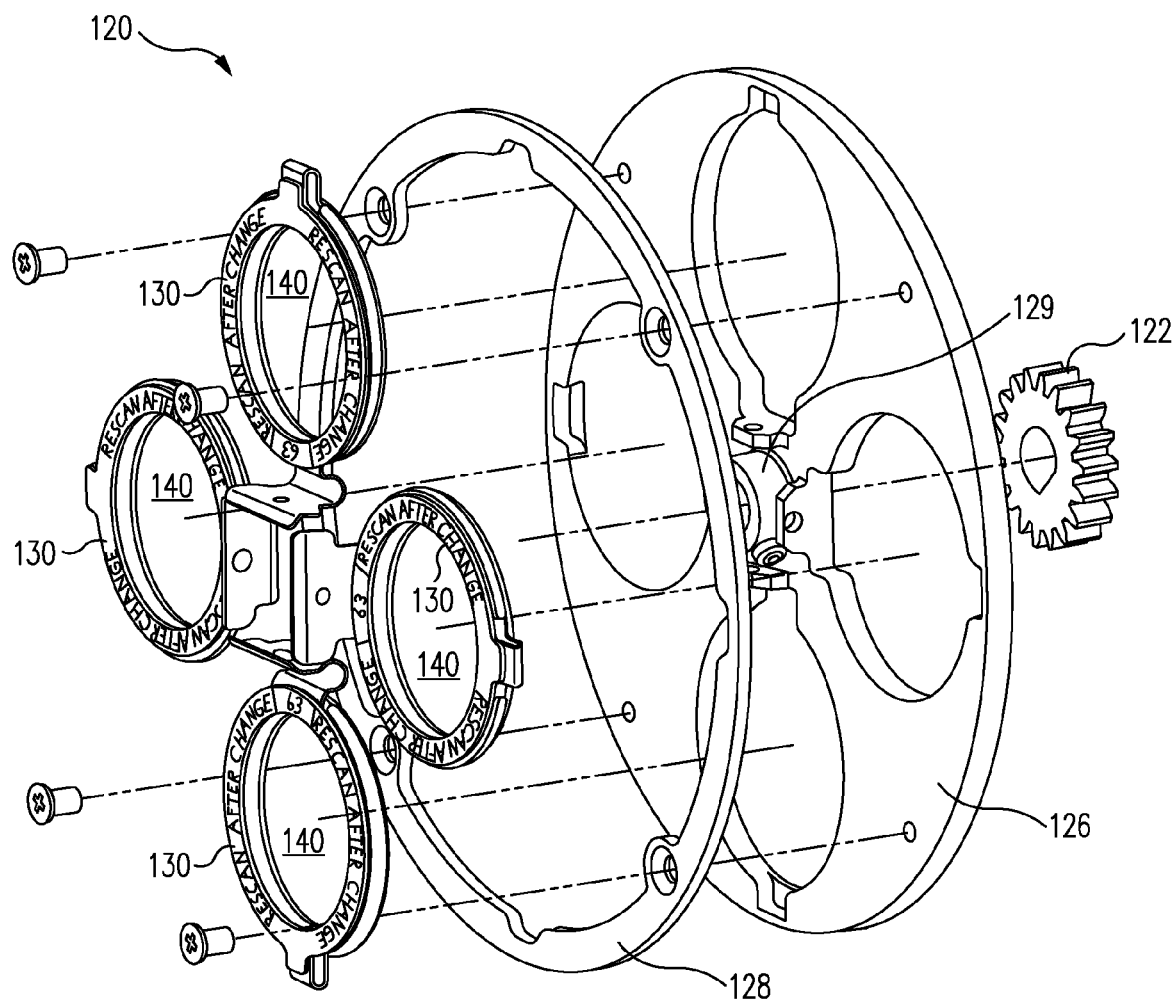
FIG. 4 illustrates an exploded view of a filter wheel in accordance with an embodiment of the invention.

FIG. 3 illustrates several additional examples of filter identifiers 150 implemented as labels attached to filter holders 130. As shown in FIG. 3, filter identifiers 150 are visible from the back side of filter wheel 120 while filters 140 and filter holders 130 are installed in filter wheel 120. Advantageously, this permits filter identifiers 150 to be read by infrared camera 100 while filter wheel 120 is installed in infrared camera 100.

Figure 2:
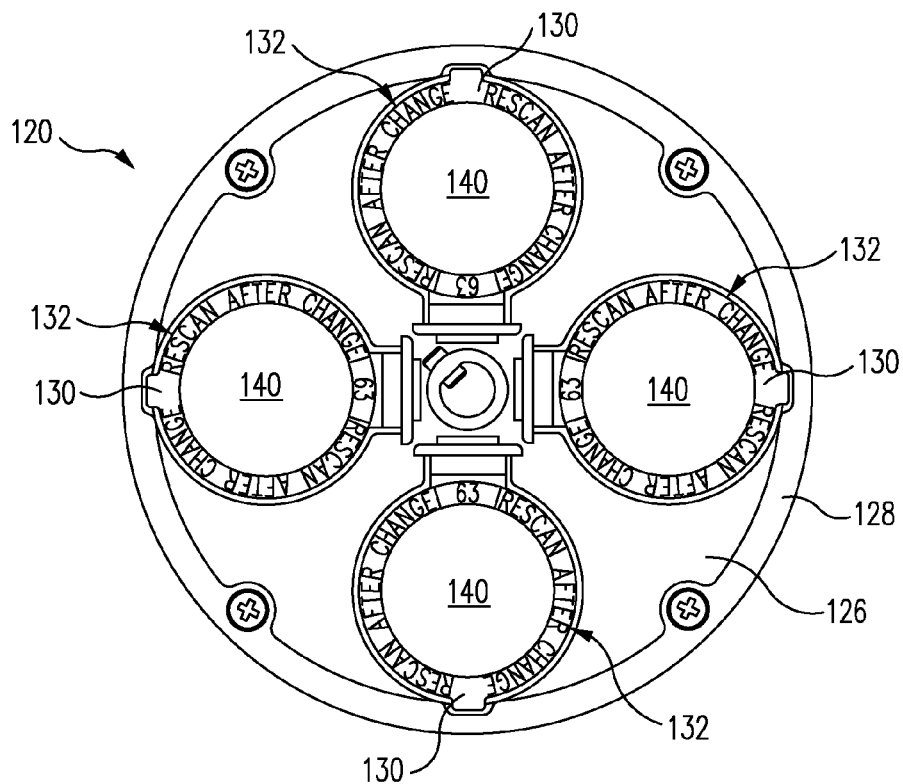
FIG. 2 illustrates a front side view of a filter wheel in accordance with an embodiment of the invention.

As shown in FIG. 2, each of filter holders 130 includes a label 132 which may be viewed from a front side of filter wheel 120. Label 132 provides a reminder to a user of filter wheel 120 to rescan filters 140 installed in filter wheel 120 after filters 140 have been replaced. In another embodiment, infrared camera 100 may remind the user to rescan filters 140 after filters 140 have been replaced, or may perform an automated rescan as further discussed herein.

Figure 9:
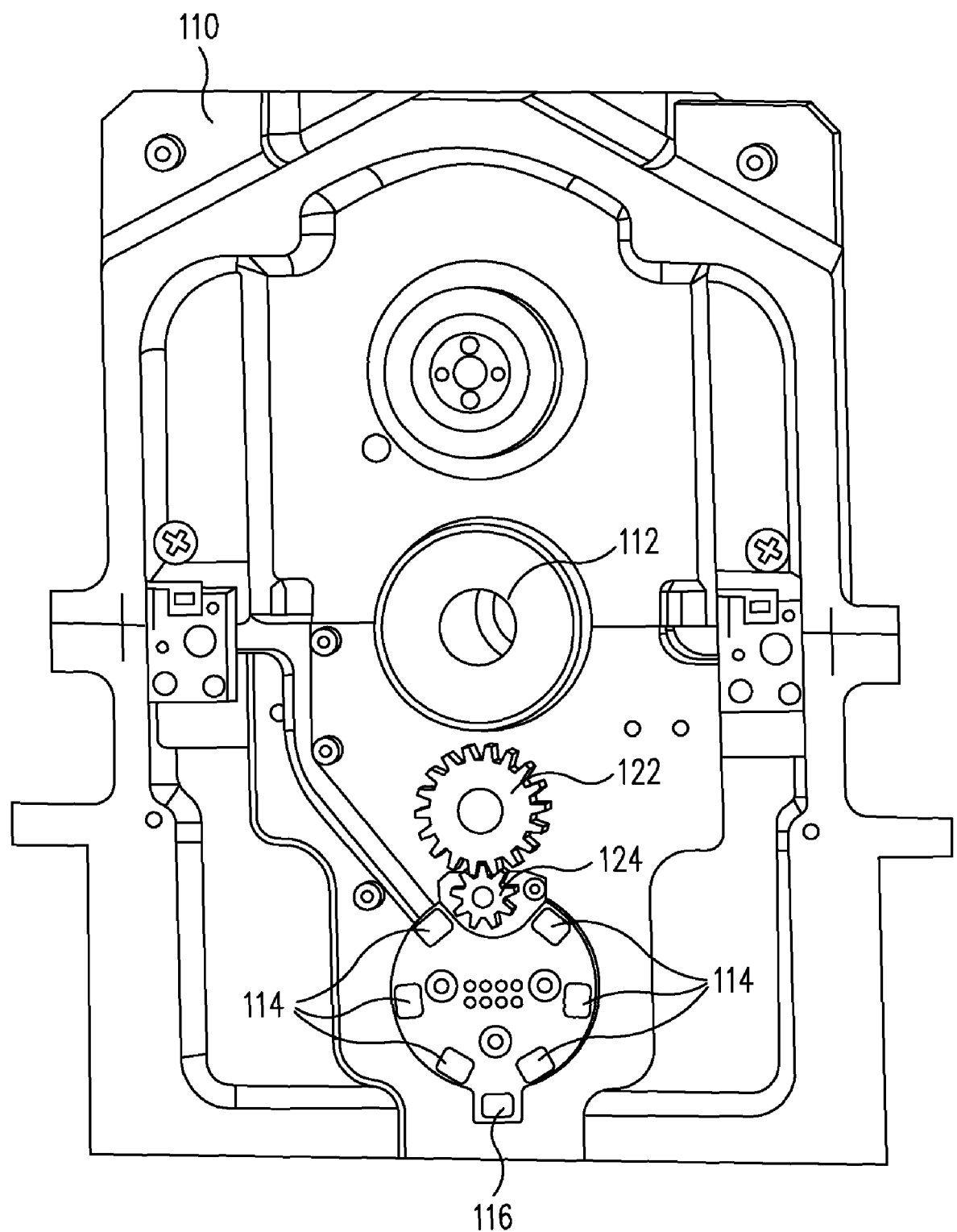
FIG. 9 illustrates a front view of an infrared camera in accordance with an embodiment of the invention.

FIG. 9 illustrates a front side view of main body 110 of infrared camera 100 in accordance with an embodiment of the invention. In FIG. 9, filter wheel 120 and shutter 116 have been removed from main body 110 to illustrate various components positioned behind filter wheel 120. These components include a plurality of filter identifier sensors 114, a filter wheel alignment sensor 116, a filter wheel gear 122, and a drive gear 124.

When installed on main body 110, filter wheel 120 may be mechanically engaged with filter wheel gear 122 which is mechanically engaged with drive gear 124. Drive gear 124 may be operated, for example, by a stepper motor housed within main body 110. Thus, as drive gear 124 rotates in response to the stepper motor, filter wheel gear 122 also rotates which causes filter wheel 120 to rotate due to the above-described mechanical engagement.

Filter identifier sensors 114 may be used to read filter identifiers 150 associated with various filters of filter wheel 120 to identify the various types of filters currently installed in filter wheel 120. Filter wheel alignment sensor 116 may be used to read position identifiers 134 (e.g., implemented by reflective or mirrored surfaces) on filter wheel 120 to determine when filter wheel 120 has been rotated to various positions. Filter identifier sensors 114 and filter wheel alignment sensor 116 may be implemented, for example, as optical sensors configured to detect reflections from particular regions 152A-F of filter identifiers 150 and from position identifiers 134. In other embodiments, filter identifier sensors 114 and filter wheel alignment sensor 116 may be implemented as mechanical sensors, electro-mechanical sensors, or other types of sensors appropriate to various applications.

Figure 10:
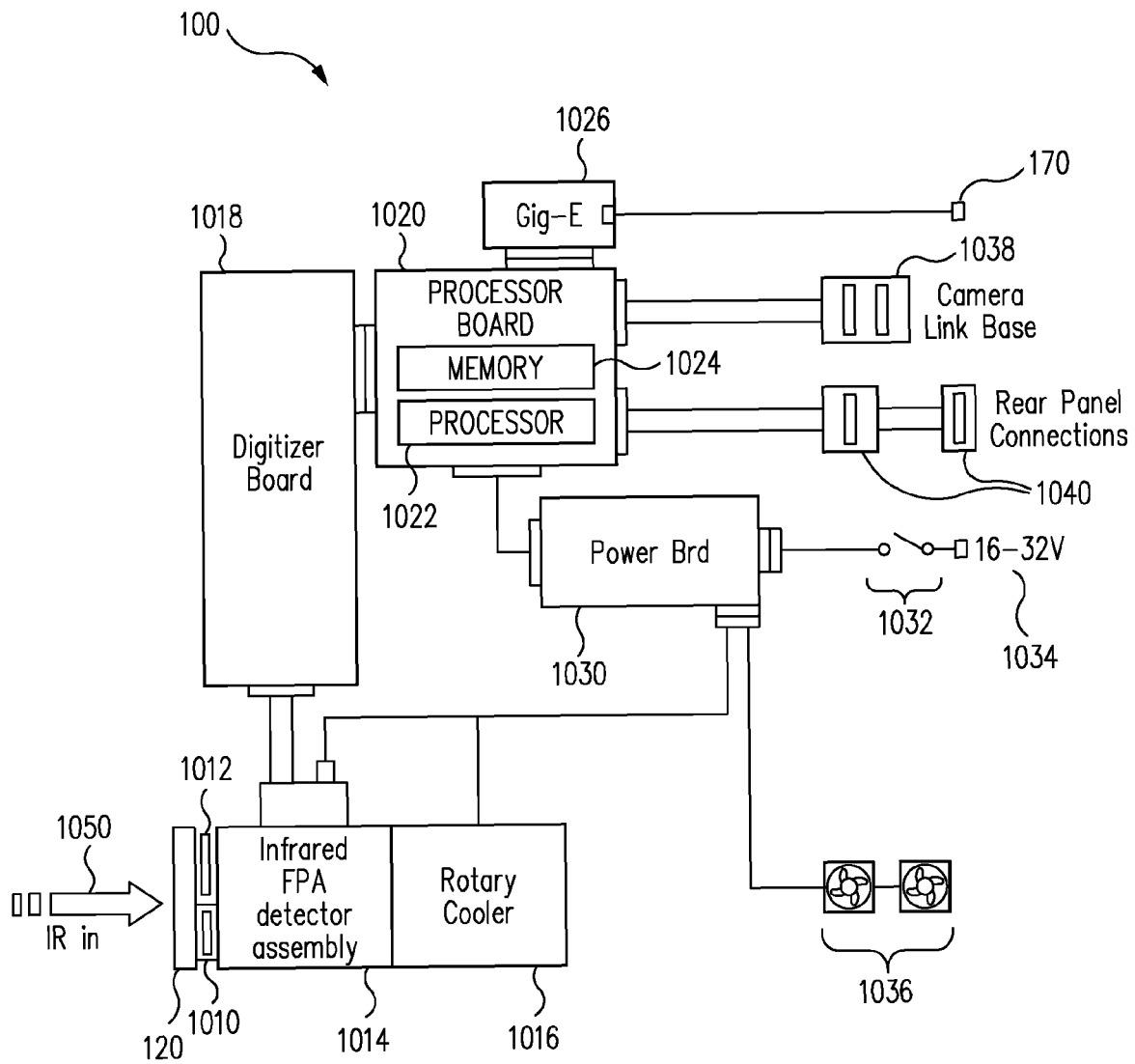
FIG. 10 illustrates a block diagram of an infrared camera in accordance with an embodiment of the invention.

FIG. 10 illustrates a block diagram of infrared camera 100 in accordance with an embodiment of the invention. Infrared camera 100 includes a processor board 1020 which controls the operation of the various components of infrared camera 100. For example, in one embodiment, processor board 1020 may control the various components illustrated in FIG. 10. Processor board 1020 includes a processor 1022 (e.g., a microcontroller, microprocessor, logic circuit, programmable logic device, or other appropriate processing device), a memory 1024, and other appropriate control circuitry. Infrared camera 100 also includes a power board 1030 that is connected to a power supply 1034 (e.g., batteries or an external power supply) through a power switch 1032 and distributes electrical power to the various components of infrared camera 100 as shown in FIG. 10.

An infrared sensor (e.g., a focal plane array (FPA) or other conventional infrared detector) 1014 is configured to detect infrared images corresponding to infrared radiation 1050 received through filter wheel 120. The detected infrared images are passed in analog form to digitizer board 1018 which converts the infrared images into digital form and passes the digital image information to processor board 1022. The digital infrared images may be provided over a communication link 170 through a gigabit ethernet board 1026 and/or to a display or other components of infrared camera 100 through rear panel connections 1040.

Rotary cooler 1016 cools infrared sensor 1014. For example, in one embodiment, rotary cooler 1016 is thermally coupled to infrared sensor 1014. Fans 1036 may be provided to cool other portions of infrared camera 100.

Infrared camera 100 also includes a Camera Link® connection 1038 for providing an interface in accordance with the Camera Link® communication protocol. Infrared camera further includes a sensor board 1010 which provides filter identifier sensors 114 and filter wheel alignment sensor 116 previously described herein. In addition, infrared camera includes a stepper motor 1012 that rotates drive gear 124 as previously described herein.

Figure 13:
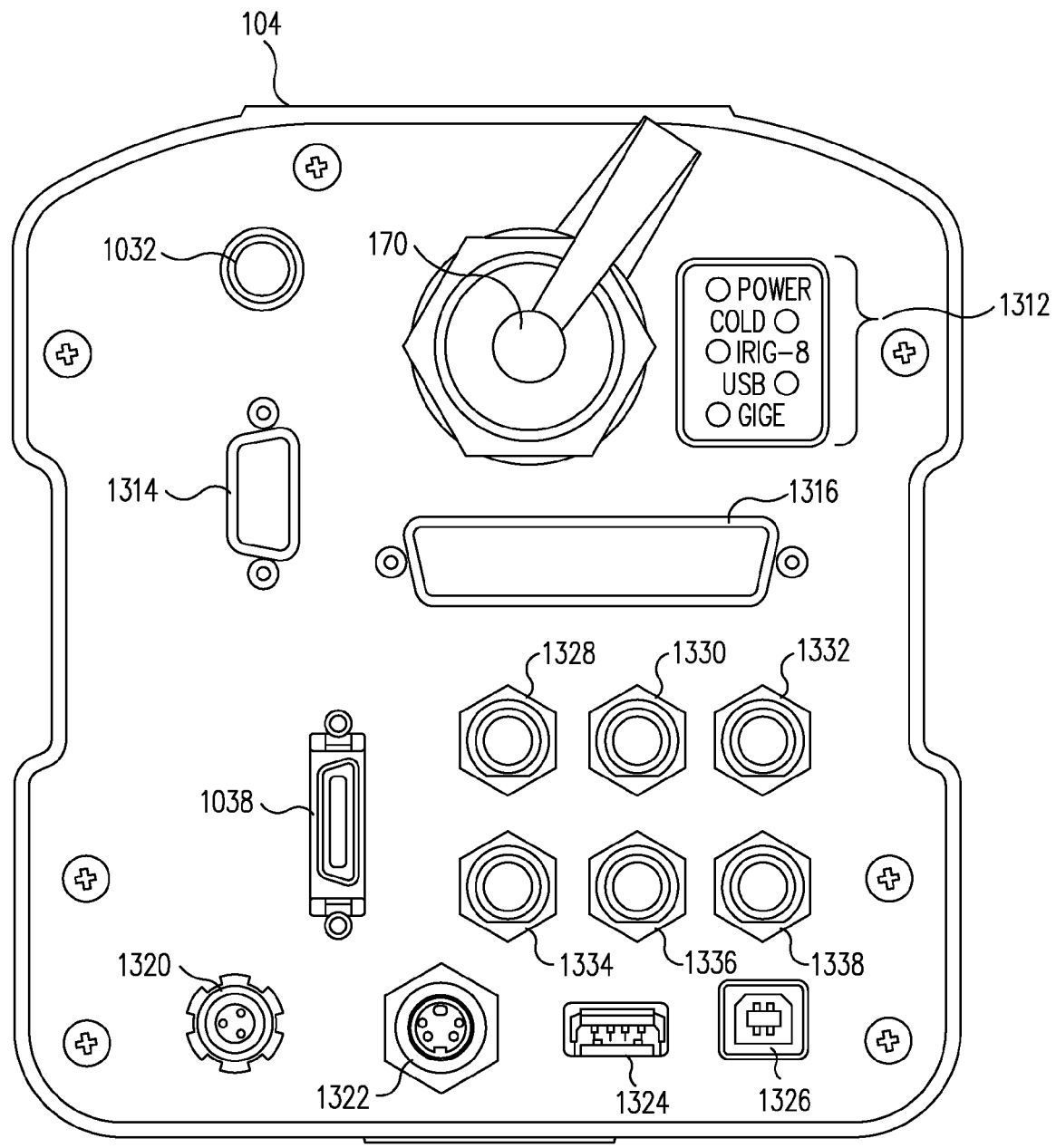
FIG. 13 illustrates a rear view of an infrared camera in accordance with an embodiment of the invention.

FIG. 13 illustrates a rear view of infrared camera 100 in accordance with an embodiment of the invention. In particular, FIG. 13 shows various components on back cover 104 of infrared camera 100 which may be implemented, for example, by additional circuitry 180 (shown in FIG. 2) and connected to main body 110 through communication link 170, Camera Link® connection 1038, and rear panel connections 1040 (shown in FIGS. 1 and 10) where appropriate.

In this regard, back cover 104 includes communication link 170 previously described herein, Camera Link® connection 1038 previously described herein, power switch 1032 previously described herein, and a power input port 1320 for receiving power from an external source (e.g., received from power supply 1034 or a 24V power source). Back cover also includes an analog video output port 1314 (e.g., for providing RBG video signals in accordance with the SVGA standard to a display) and an S-Video port 1322 for providing S-Video signals to a display.

Back cover further includes an auxiliary port 1316 for providing interfaces to measure external temperatures, communicate with external optical systems, send/receive transistor-transistor-logic (TTL) data words, and other types of interfaces as may be desired for particular applications.

In addition, back cover 104 includes a Universal Serial Bus (USB) host connection 1324 (e.g., for connecting a USB mass storage device) and a USB client connection 1326 (e.g., for receiving appropriate command and control communications). Back cover 104 also includes a plurality of status lights 1312 (e.g., LEDs) for indicating the status of various aspects of infrared camera 100 such as power status, FPA temperature, Inter-range instrumentation group (IRIG) timecode B lock, communication configuration (e.g., USB or GigE Vision®), error status, or other aspects of infrared camera 100.

Back cover 104 further includes a trigger input port 1328 for receiving TTL trigger signals to cause infrared camera 100 to generate a sequence of frames, a synchronization input port 1330 for receiving TTL synchronization signals to drive the frame rate of infrared camera 100, a composite video output port 1332 for providing National Television System (NTCS) or Phase Alternating Line (PAL) video output signals to a display, a generator lock input port 1334 for receiving video signals to synchronize video output signals of infrared camera 100, a synchronization output port 1336 for providing synchronization signals to synchronize external cameras or instruments, and a timing input port 1338 for receiving Inter-Range Instrumentation Group (IRIG) standard timing input signals.

Figure 11:
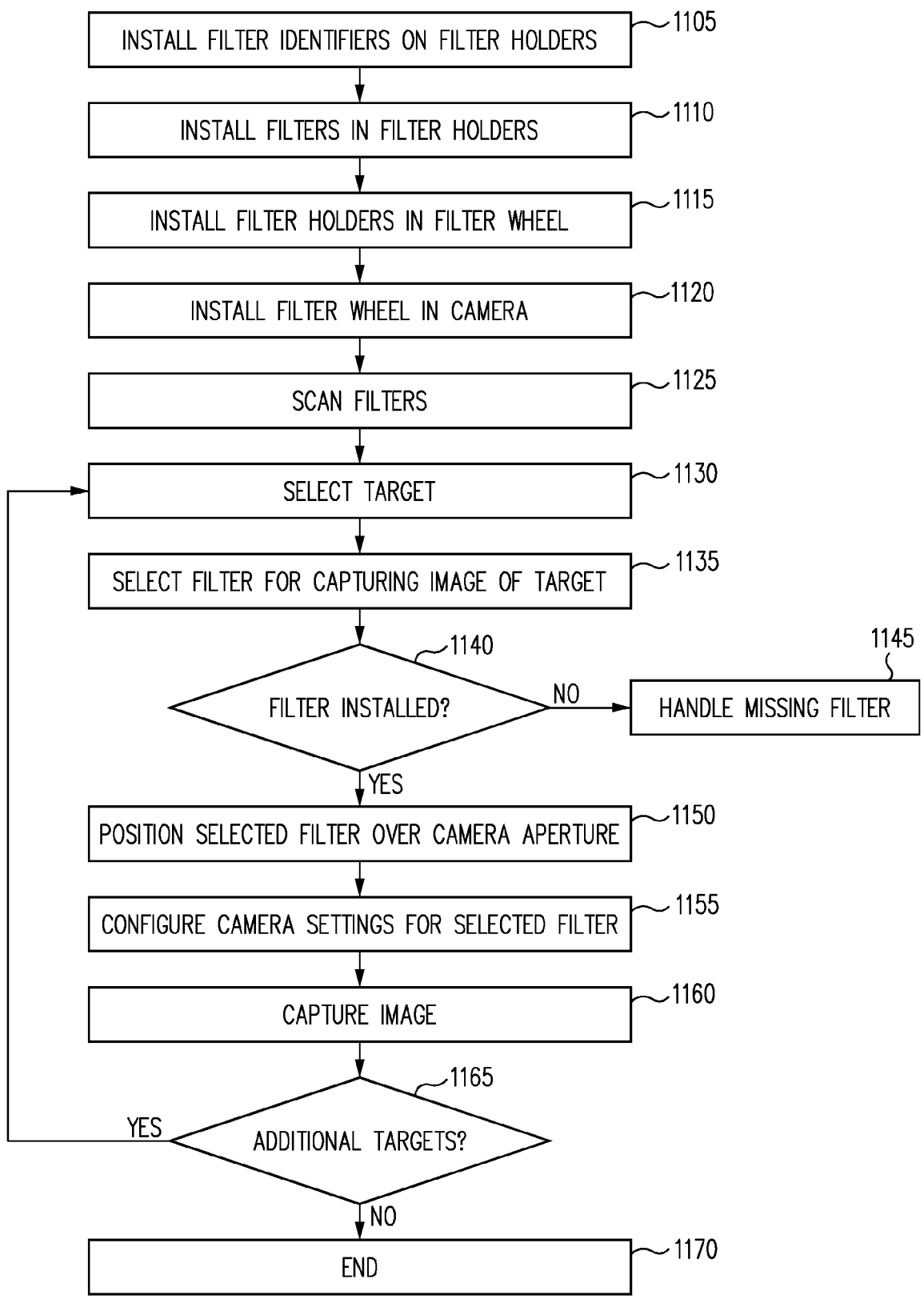
FIG. 11 illustrates a process of using a filter wheel in accordance with an embodiment of the invention.

FIG. 11 illustrates a process of using filter wheel 120 in accordance with an embodiment of the invention. In one embodiment, infrared camera 100 may prompt a user to perform one or more of the steps of the process of FIG. 11 by, for example, displaying instructions to the user on a display, graphical user interface, or other appropriate user interface provided by infrared camera 100.

In initial step 1105, filter identifiers 150 are installed on filter holders 130. In step 1110, filters 140 are installed in appropriate filter holders 130 corresponding to the installed filter identifiers 150. In step 1115, filter holders 130 having the installed filters 140 and filter identifiers 150 are installed in filter wheel 120. Other configurations of filter holders 130, filters 140, and filter identifiers 150 may be used in other embodiments. As such, steps 1105 to 1120 may be modified as appropriate to accommodate such configurations and embodiments.

In step 1120, filter wheel 120 is installed in infrared camera 100. In this regard, shaft 129 of filter wheel 120 may be engaged with filter wheel gear 122 which engages with drive gear 124.

Figure 12:
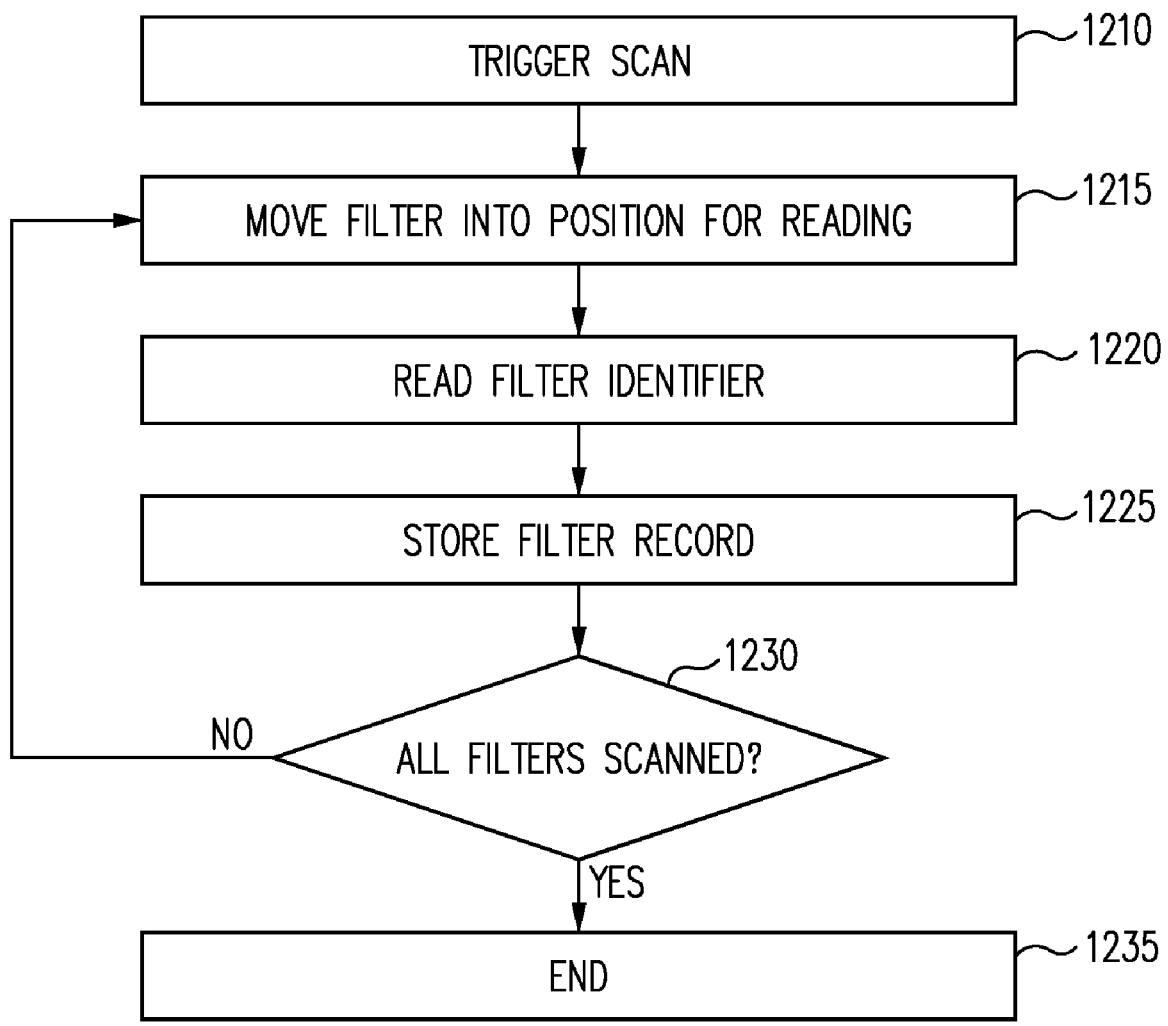
FIG. 12 illustrates a process of scanning a plurality of filter identifiers in accordance with an embodiment of the invention.

In step 1125, infrared camera 100 scans filters 140 currently installed in filter wheel 120 as further described in the process of FIG. 12. As a result of step 1125, infrared camera 100 will have one or more records (for example, a populated table or other appropriate data structures) of all filters 140 currently available to be used by infrared camera 100.

For example, in one embodiment, infrared camera 100 may maintain the following Table 2 in memory 1024 of processor board 1020 to identify filters 140 currently installed in filter wheel 120:

TABLE 2

| Filter Identifier 150 | Filter Name/Target | Filter Present |
|---|---|---|
| 1 | ND 1.0 | No |
| 2 | ND 2.0 | No |

TABLE 2-continued

| Filter Identifier 150 | Filter Name/Target | Filter Present |
|---|---|---|
| 3 | ND 3.0 | No |
| 4 | ND 0.3 | No |
| 5 | ND 0.6 | No |
| 6 | ND 1.45 | No |
| 7 | Standard MWIR | No |
| 8 | ATM | No |
| 9 | Solar Block (SRX) | No |
| 10 | Thru Glass (TGL) | No |
| 11 | Glass High Temp (GHT) | Yes |
| 12 | Narrow Band Flame or HT | No |
| 13 | Broad Band Flame | Yes |
| 14 | Polyethylene (PEN) | No |
| 15 | Plastic | No |
| 16 | CO2 | Yes |
| 17 | Nitrous-Oxide | Yes |
| 18 | COS | No |

As shown in Table 2, four filters 140 corresponding to filter identifiers 11, 13, 16, and 17 are currently installed in filter wheel 120. As identified in Table 2 the installed filters 140 may be used when capturing infrared images of high temperature glass, broad band flames, carbon dioxide, and nitrous oxide.

In step 1130, a target is selected for image capture. For example, in one embodiment, a user of infrared camera 100 may select the target by positioning infrared camera 100 in proximity to the target. In another embodiment, the user may select the target using an appropriate user interface of infrared camera 100 which identifies various types of targets specified in Table 2 above. In another embodiment, processor 1022 of infrared camera 100 may select the target for the user. In various embodiments, targets may correspond to objects, types of materials, types of applications using infrared radiation (e.g., gas detection including possibly type of gas, building diagnostics, utilities, surveillance, airborne, or other types of applications), or other subjects over any infrared wavelength ranges, over any temperature ranges, or having other characteristics as may be desired, as would be understood by one skilled in the art.

As previously described, different targets may radiate and/or absorb various infrared wavelengths depending, for example, on the material composition of each target. Thus, different filters 140 may be required to capture infrared images of different targets. Accordingly, in step 1135, an appropriate filter 140 is selected for capturing an infrared image of the selected target.

In one embodiment, processor 1022 of infrared camera 100 may perform step 1135 by selecting an appropriate filter 140 based on the filter identifier 150 associated with the selected type of target as identified by a lookup or reverse lookup performed on an appropriate table or other data structure stored in memory 1024. For example, if the selected target corresponds to carbon dioxide, then processor 1022 may use Table 2 described above to select the filter 140 corresponding to filter identifier 17. In another embodiment, the user may perform step 1135 by selecting an appropriate filter 140 based on the type of target selected in previous step 1130.

In step 1140, processor 1022 of infrared camera 100 determines whether the filter 140 selected in step 1135 is currently installed in filter wheel 120. For example, in one embodiment, processor 1022 may inspect Table 2 during step 1140. In this regard, if the "Filter Present" column of Table 2 indicates that the selected filter 140 is currently installed in filter wheel 120, then the process of FIG. 11 continues to step 1150. Otherwise, the process of FIG. 11 continues to step 1145.

In step 1145, a condition exists in which the selected filter 140 to be used for capturing images of the selected target is not currently installed in filter wheel 120. This condition can be handled using several different approaches as may be desired in different embodiments.

For example, in one embodiment, the process of FIG. 11 may return to step 1110 in which the user installs the selected filter 140 in filter wheel 120. In this regard, a display of infrared camera 100 may inform the user of the particular filter 140 to be installed and remind the user to rescan filters 140 (e.g., remind the user to repeat step 1125) after the particular filter 140 has been installed in filter wheel 120. Infrared camera 100 may also perform such a rescan operation automatically in response to the installation of filter wheel 120 (e.g., in response to step 1120 in which filter wheel 140 having the particular filter is installed in infrared camera 100).

In another embodiment, processor 1022 of infrared camera 100 may select another filter 140 from the available filters 140 currently installed in filter wheel 120. For example, processor 1022 may determine which of the currently installed filters 140 best approximates the performance of the filter 140 previously selected in step 1140 with the user optionally notified by a display provided by infrared camera 100. Following the selection of another filter in step 1145, the process of FIG. 11 may continue to step 1150.

In yet another embodiment, the process of FIG. 11 may end (step 1170). In this regard, a display of infrared camera 100 may inform the user of an error condition which can prevent images of the selected target from being captured.

Referring now to step 1150, infrared camera 100 positions the selected filter 140 (e.g., selected in step 1135 or step 1145) over aperture 112. For example, in one embodiment, stepper motor 1012 may rotate filter wheel 120 (e.g., by rotating drive gear 124) until the filter identifier 150 corresponding to the selected filter 140 is positioned over filter identifier sensors 114. The filter identifier 150 is read by filter identifier sensors 114 and identified by infrared camera 100 as corresponding to the selected filter 140. Then, the selected filter 140 is rotated into position in front of aperture 112. For example, filter wheel 120 may be rotated approximately 180 degrees to move the selected filter 140 from a position in front of filter identifier sensors 114 to another position in front of aperture 112. The position of filter wheel 120 may be determined by filter wheel alignment sensor 116 reading position identifiers 134.

In step 1155, processor 1022 configures appropriate camera settings (e.g., various selectable camera settings) of infrared camera 100 based on the selected filter 140. For example, in one embodiment, processor 1022 may adjust: integration time, gain, bandwidth, infrared detector biases, digital gain, digital offset, automatic or manual gain control, video contrast, and video brightness of infrared camera 100 as would be understood by one skilled in the art. As a result, infrared camera 100 may be optimized to capture infrared images using the selected filter 140.

In step 1160, infrared camera 100 captures one or more infrared images of the selected target using the selected filter 140 and appropriately configured settings of infrared camera 100. If infrared images of additional targets are desired (step 1165), then the process of FIG. 11 returns to step 1130. Otherwise, the process of FIG. 11 ends (step 1170).

FIG. 12 illustrates a process of scanning filter identifiers 150 in accordance with an embodiment of the invention. As described above, the process of FIG. 12 may be performed during step 1125 of FIG. 11. In one embodiment, infrared camera 100 may prompt a user to perform one or more of the steps of the process of FIG. 12 by, for example, displaying instructions to the user on a display or other appropriate user interface provided by infrared camera 100.

In step 1210, a filter scan operation is triggered. For example, in one embodiment, step 1210 may be performed by a user selecting an appropriate button on infrared camera 100. In this regard, it will be appreciated that labels 132 described above (see FIG. 2) may remind the user to trigger the filter scan operation after one or more filters 140 have been installed or replaced in filter wheel 120. In another embodiment, the filter scan operation may be triggered by infrared camera 100 itself in response to the installation of filter wheel 120 in step 1120.

In step 1215, infrared camera 100 moves one of filters 140 currently installed in filter wheel 120 into position for reading its associated filter identifier 150. For example, in one embodiment, stepper motor 1012 may rotate filter wheel 120 (e.g., by rotating drive gear 124) until the filter identifier 150 corresponding to the filter 140 is positioned over filter identifier sensors 114.

In step 1220, filter identifier sensors 114 read the filter identifier 150 associated with the filter 140. In step 1225, processor 1022 stores in memory 1024 a record of the filter 140 in response to the filter identifier 150 read in step 1220. For example, in one embodiment, processor 1022 may populate a table such as Table 2 described above to indicate that the filter 140 having the filter identifier 150 read in step 1220 is currently installed in filter wheel 120.

If additional filters 140 currently installed in filter wheel 120 remain to be scanned (step 1230), then the process of FIG. 12 returns to step 1215 where infrared camera 100 moves the next filter 140 into position for reading its associated filter identifier 150. If all filters 140 of filter wheel 120 have been scanned (step 1230), then the process of FIG. 12 ends (step 1235).

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more machine readable mediums (e.g., computer readable media or other mediums). It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. An infrared camera comprising:
an infrared sensor;
a filter wheel comprising:
a plurality of filters adapted to selectively filter infrared radiation prior to the infrared radiation being received by the infrared sensor, and
a plurality of filter identifiers associated with the filters, wherein each filter identifier identifies a corresponding one of the filters;
a plurality of sensors adapted to read the filter identifiers to identify the filters installed in the filter wheel;
a memory; and
a processor adapted to store in the memory a record of the filters installed in the filter wheel based on the filter identifiers read by the sensors.

2. The infrared camera of claim 1, wherein the processor is adapted to determine whether a selected filter is installed in the filter wheel based on the record.

3. The infrared camera of claim 2, further comprising a motor adapted to rotate the filter wheel to position the selected filter in front of the focal plane array in response to the processor if the selected filter is installed in the filter wheel.

4. The infrared camera of claim 2, wherein the processor is adapted to selectively configure settings of the infrared camera based on the selected filter.

5. The infrared camera of claim 1, wherein the record associates the filters with the filter identifiers and a plurality of targets.

6. The infrared camera of claim 5, wherein the processor is adapted to select one of the filters based on an association between the selected filter and a selected target identified in the record.

7. The infrared camera of claim 1, wherein the filter wheel further comprises a plurality of filter holders adapted to secure the filters in the filter wheel, wherein the filter identifiers are provided on the filter holders.

8. The infrared camera of claim 1, wherein the filter identifiers are provided on the filters.

9. The infrared camera of claim 1, wherein each filter identifier encodes a binary number to identify a corresponding one of the filters.

10. An apparatus comprising:
a filter wheel comprising:
a plurality of filters adapted to selectively filter infrared radiation corresponding to a plurality of targets, and
a plurality of filter identifiers associated with the filters, wherein each filter identifier identifies a corresponding one of the filters;
a plurality of sensors adapted to read the filter identifiers to identify the filters installed in the filter wheel;
a memory; and
a processor adapted to store in the memory a record of the filters installed in the filter wheel based on the filter identifiers read by the sensors.

11. The apparatus of claim 10, wherein the filter wheel further comprises a plurality of filter holders adapted to secure the filters in the filter wheel, wherein the filter identifiers are provided on the filter holders.

12. The apparatus of claim 10, wherein the filter identifiers are provided on the filters.

13. The apparatus of claim 10, wherein each filter identifier encodes a binary number to identify a corresponding one of the filters.

14. The apparatus of claim 10, wherein the filter wheel is adapted to be rotated by an infrared camera to selectively position the filters in front of an infrared sensor of the infrared camera.

15. A method of identifying filters of an infrared camera, the method comprising:
scanning a plurality of filter identifiers associated with the filters installed in a filter wheel of the infrared camera, wherein the filters are adapted to selectively filter infrared radiation prior to the infrared radiation being received by an infrared sensor of the infrared camera;
determining whether a selected filter is installed in the filter wheel based on the scanning; and
rotating the filter wheel to position the selected filter in front of an infrared sensor of the infrared camera if the selected filter is installed in the filter wheel.

16. The method of claim 15, wherein the scanning comprises:
reading the filter identifiers using sensors of the infrared camera; and
storing a record of the filters installed in the filter wheel based on the filter identifiers read by the sensors.

17. The method of claim 15, wherein the scanning is triggered by a user of the infrared camera.

18. The method of claim 15, wherein the scanning is triggered by the infrared camera.

19. The method of claim 15, further comprising:
prompting a user of the infrared camera to install the selected filter in the filter wheel if the selected filter is not installed in the filter wheel; and
scanning a filter identifier associated with the selected filter.

20. The method of claim 15, further comprising selectively configuring settings of the infrared camera based on the selected filter.

21. The method of claim 15, further comprising associating the filters with the filter identifiers and a plurality of targets.

22. The method of claim 21, further comprising selecting the selected filter based on an association between the selected filter and a selected one of the targets.

23. The method of claim 15, wherein the filter wheel further comprises a plurality of filter holders adapted to secure the filters in the filter wheel, wherein the filter identifiers are provided on the filter holders.

24. The method of claim 15, wherein the filter identifiers are provided on the filters.

25. The method of claim 15, wherein each filter identifier encodes a binary number to identify a corresponding one of the filters.

26. An infrared camera comprising:
a plurality of filters adapted to selectively filter infrared radiation prior to the infrared radiation being received by an infrared sensor for the infrared camera;
means for securing the filters;
means for identifying each of the filters;
means for reading the identifying means to identify the filters installed in the securing means; and
means for storing a record of the filters installed in the securing means based on the identifying means read by the reading means.

* * * * *